United States Patent [19]

Nelle et al.

[11] Patent Number: 5,793,201
[45] Date of Patent: Aug. 11, 1998

[54] POSITION INDICATING ENCODER WITH MAGNETIC END POSITION DETERMINING ELEMENTS

[75] Inventors: Günther Nelle, Bergen; Walter Kranitzky; Herbert Mauerberger, both of Traunstein, all of Germany

[73] Assignee: Dr. Johannes Heidenhain GmbH, Traunreut, Germany

[21] Appl. No.: 391,979

[22] Filed: Feb. 21, 1995

[30] Foreign Application Priority Data

| Feb. 22, 1994 | [DE] | Germany | 44 05 513.7 |
| Jul. 19, 1994 | [DE] | Germany | 44 25 416.4 |
| Aug. 2, 1994 | [DE] | Germany | 44 27 278.2 |

[51] Int. Cl.$^6$ ............... G01B 7/00; G01B 7/02; H03K 17/97; H01H 36/00
[52] U.S. Cl. ............... 324/207.14; 324/207.2; 324/207.24; 33/706
[58] Field of Search ............... 324/207.13, 207.14, 324/207.2, 207.21–207.26, 173, 174, 251, 252, 235, 227; 338/32 H; 307/309; 33/706, 707, 708

[56] References Cited

U.S. PATENT DOCUMENTS

| 3,660,696 | 5/1972 | Rittmann | 324/251 |
| 4,363,964 | 12/1982 | Schmitt | 250/237 G |
| 4,551,676 | 11/1985 | Amemiya et al. | 324/207.21 |
| 4,628,609 | 12/1986 | Rieder et al. | 33/707 |
| 4,658,214 | 4/1987 | Petersen | 324/207.24 |
| 4,792,788 | 12/1988 | Kumar | 324/207.2 X |
| 4,987,040 | 1/1991 | Iijima et al. | 324/207.22 X |
| 5,003,363 | 3/1991 | Lachmann | 324/207.22 X |
| 5,004,982 | 4/1991 | Chaney et al. | 324/207.22 |
| 5,097,209 | 3/1992 | Santos | 324/207.25 X |
| 5,115,573 | 5/1992 | Rieder et al. | 33/706 |
| 5,218,298 | 6/1993 | Ravi Vig . | |
| 5,241,173 | 8/1993 | Howley et al. | 324/207.22 X |

FOREIGN PATENT DOCUMENTS

| 0077423 | 10/1981 | European Pat. Off. . |
| 0145844 | 6/1985 | European Pat. Off. . |
| 0190639 | 1/1986 | European Pat. Off. . |
| 0171383 | 2/1986 | European Pat. Off. . |
| 3526206 | 2/1987 | Germany . |
| 4111873 | 10/1992 | Germany . |
| 9209801 | 10/1992 | Germany . |
| 4200616 | 1/1993 | Germany . |
| 9221985 | 12/1992 | WIPO . |

OTHER PUBLICATIONS

Abstract Japanese Publ. JP-A-56-118,612, Dec. 12, 1981, #196 (P-93) (868).

*Primary Examiner*—Walter E. Snow
*Attorney, Agent, or Firm*—Anderson, Kill & Olick, P.C.

[57] ABSTRACT

An encoder for determining a position of an object and including a measuring standard, a standard carrier, and a scanner displaceable relative to the measuring standard for scanning the measuring standard, with the limit positions switches being formed as magnetic stripes secured in the end positions of the at least one of measuring standard and the standard carrier, and with the scanner including a Hall element for scanning the magnetic stripes.

35 Claims, 10 Drawing Sheets

1

POSITION INDICATING ENCODER WITH MAGNETIC END POSITION DETERMINING ELEMENTS

BACKGROUND OF THE INVENTION

The invention relates to an encoder and, in particular, to a linear or angular encoder including a measuring standard, a measuring standard carrier and a scanner displaceable relative to the measuring standard, with a scannable magnetic element provided at least in the limit position region of the measuring standard and/or of the measuring standard carrier.

The encoders or position-measuring devices of the above-described type are used, in particular, in machine tools for measuring a relative position between a tool and a machined workpiece, and in coordinate measuring machines for determining a position and dimensions of a test object.

For safety reasons, it is required, e.g., during measuring in machine tools, to limit the permissible operational regions with limit position switches. When the limit position switch is reached, the displacement of the movable unit is immediately stopped to prevent a collision with adjacent structural elements.

In order to reduce the space requirements for the limit position switches and costs connected with their installation, and in order to increase the versatility of encoders, European Patent 0 145 814 B1 suggests providing a limit position switch on a surface of a scale or a graduation carrier of the measuring device or encoder. The limit position switches are formed as electromechanical control cams.

Providing limit positions switches directly on the encoder is also disclosed in European Publication EP 0 171 383 B1 and German Publications DE 42 00 616 A1, DE 41 11 873 and DE 92 09 801 U1. The German Publication DE 92 09 801, of which the present invention is an improvement, discloses an encoder in which the limit position switch is represented by a plurality of magnetic scannable control marks.

An object of the invention is to provide an encoder, in particular a linear or angular encoder, in which the recognition of an end position is made possible with simpler means.

SUMMARY OF THE INVENTION

This and other objects of the invention, which will become apparent hereinafter, are achieved by providing in the scanner, a Hall element for scanning magnetic marks indicating the limit position region and provided on the measuring standard and/or the standard carrier.

BRIEF DESCRIPTION OF THE DRAWINGS

The object and features of the present invention will become more apparent and the invention itself will be best understood from the following detailed description of the preferred embodiments, when read with reference to the accompanying drawings, wherein.

DETAILED DESCRIPTION OF THE PREFERRED EMBODIMENTS

Figure 1:
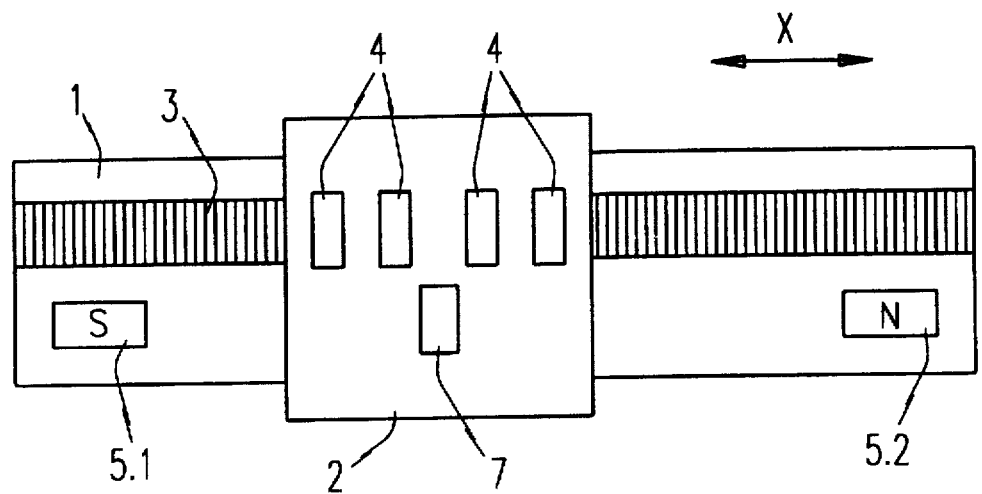
FIG. 1 shows a measuring standard of a linear encoder according to the present invention.

In FIG. 1, a measuring standard 1 of the linear encoder is shown schematically. In encapsulated linear encoders, the measuring standard is protected by being secured inside of a hollow profile which is mounted on a slide of a machine tool or a measuring machine.

On the many occasions when the linear encoder is used often, the measuring standard is secured directly on an appropriate machine part.

During a measuring operation, a scanner 2 is displaced, at a small distance from the measuring standard in a measuring direction X, whereby a relative position between the measuring standard 1 and the scanner 2 is established.

Incremental graduation 3 provided on the measuring standard 1, which is formed of glass, is scanned in, per se, known manner with a plurality of scanning elements 4. In the region of both ends of the measuring standard 1, there are provided two magnetic stripes 5.1 and 5.2, respectively. The magnetic stripes 5.1 and 5.2 are glued to the surface of the measuring standard 1.

For scanning the magnetic stripes 5.1 and 5.2, a Hall element 7 is provided in the scanner 2. When the scanner 2 reaches a respective end region of the measuring standard 1 and, thereby, the region of the respective stripe 5.1 or 5.2, the Hall element generates a signal communicated to the drive of the machine, and the machine drive immediately turns off.

Thus, the magnetic stripes 5.1 and 5.2, together with the Hall element 7, form limit position switches which insure the protection from overrunning respective limit positions.

As known, Hall elements represent a magnetic field-dependent semiconductor the operation of which is based on the use of the Hall effect. In the Hall element, which extends transverse to a magnetic field, a voltage is generated between two opposite sides of a thin semiconductor plate when current flows through the plate. The Hall voltage changes in accordance with the direction and the magneto-motive force of the magnetic field as well as in accordance with the direction and the strength of the current.

The appearance of the voltage is caused by a combined action of the magnetic field and the current, so that one can speak of a generator. That is why Hall elements are often called Hall generators. They are also called Hall effect transducers or Hall sensors. The advantage of Hall elements, in comparison with other magnetic field sensors, consists in that the output signal depends substantially linearly on the magnetomotive force of the magnetic field, and the signal sign changes with the reversal of poles of the magnetic field.

In comparison with the reed switches, a further advantage of the Hall elements consists in that they have no mechanical contacts and require very little space for their installation.

Figure 2:
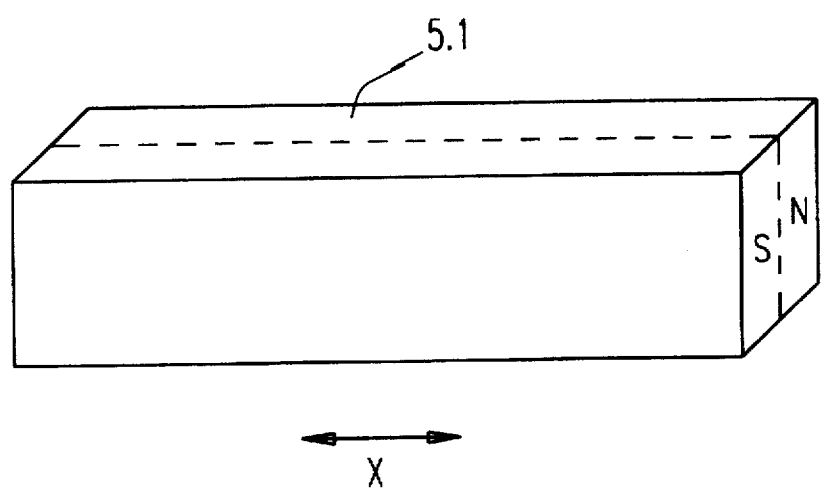
FIG. 2 shows a magnetic stripe of the linear encoder shown in FIG. 1.

The formation of the magnetic stripes 5.1 and 5.2 is shown in FIG. 2. The polarity of the stripes is so selected that one surface of the stripe 5.1 or 5.2, which faces the Hall element 7, forms one of north and south poles, and the opposite side forms the other one of north and south poles. Thereby, the generated magnetic field extends transverse to the measuring direction X.

With such a formation of the magnetic stripes, it becomes possible to form elongate magnetic stripes which insure their more reliable functioning as limit position switches. Such magnetic stripes may have a length of several cm and a thickness of 1 mm.

Further, when magnetic stripes 5.1 and 5.2, formed as discussed above, are used, a distinction between the righthand and lefthand end regions of the measuring standard 1 can easily be made.

As can be seen from FIG. 1, if the magnetic stripes 5.1 and 5.2 are glued to the measuring standard 1 at opposite ends thereof, with surfaces defining north and south poles, respectively, the surfaces of the magnetic stripes 5.1 and 5.2 defining, respectively, south and north poles, would be facing the Hall element 7.

As discussed above, the Hall element 7 is a magnetic field-sensing sensor and, thus, is capable of recognizing the direction of the magnetic field. Therefore, the Hall element 7 will generate different level signals at the opposite ends of the measuring standard 1.

Figure 3:
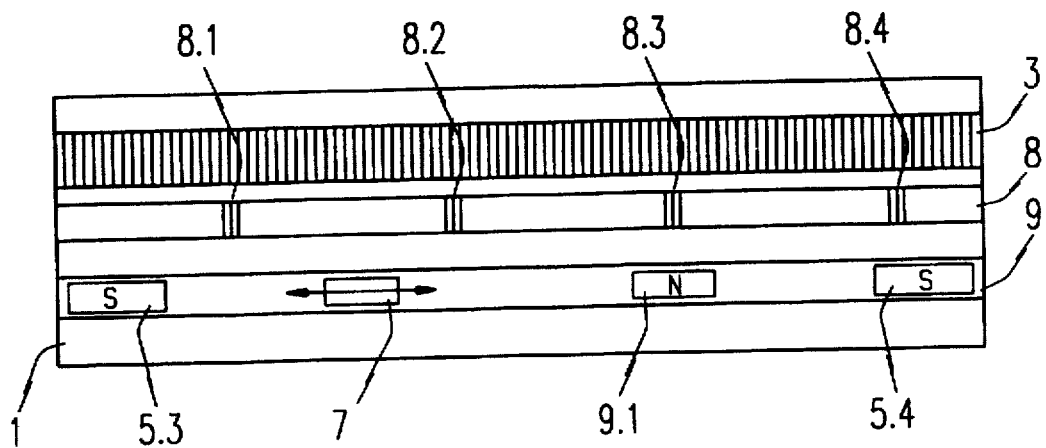
FIG. 3 shows a measuring standard with reference marks.

The present invention is likewise applicable to a linear encoder with a plurality of reference marks 8.1–8.4, which is shown schematically in FIG. 3. As shown in FIG. 3, a reference mark track 8 with a plurality of equally spaced reference marks 8.1–8.4, extends along the measuring standard 1. The reference marks 8.1–8.4 are selectively actuated, in accordance with the requirement, in per se known manner (disclosed, for example, in German publication DE 25 40 412 C3.

For effecting the reference mark selection, there is provided another track 9, which includes a magnetic stripe 9.1 associated with the arbitrary selected reference mark 8.3. In addition, according to the present invention, additional magnetic stripes 5.3 and 5.4, which corresponds to opposite end regions of the measuring standard 1, are provided in the track 9. The three magnetic stripes 5.3, 5.4 and 9.1 are scanned with the Hall element 7.

Because of different polarities of magnetic stripes 5.3, 5.4 and 9.1, a distinction between the reference mark 8.3 and the end regions can be made.

Figure 4:
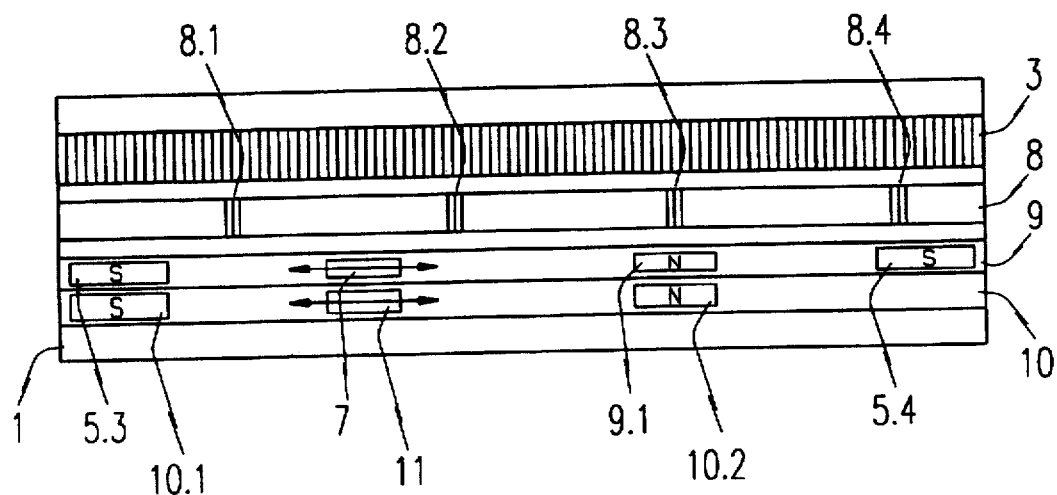
FIG. 4 shows another embodiment of a measuring standard with reference marks.

For example, if the reference mark 8.3 faces the Hall element 7 with the north pole, the end region marks may face the Hall element 7 with the south pole. Here, additionally, a distinction between the righthand and the lefthand regions of the mark 8.3 is possible. To this end, as shown in FIG. 4, there is provided a further track 10 with magnetic stripes 10.1 and 10.2. The magnetic stripes 10.1 and 10.2 are scanned with an additional Hall element 11 provided in the scanner 2.

Figure 5A:
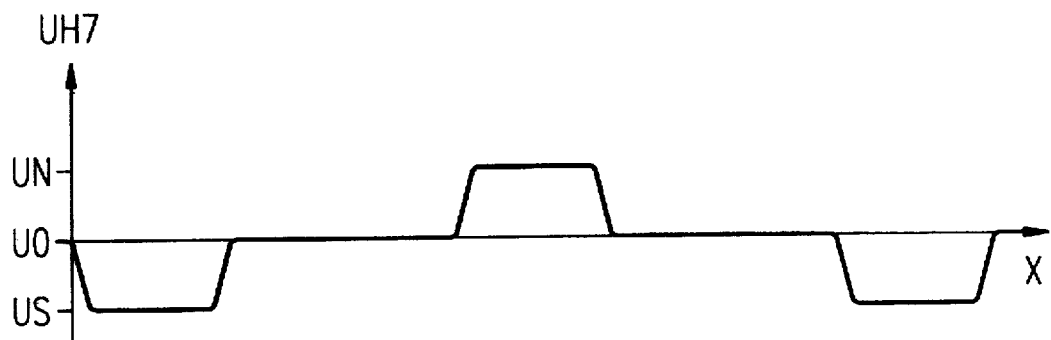
FIGS. 5a and 5b show signal diagrams of the linear encoder of FIG. 4.
Figure 5B:
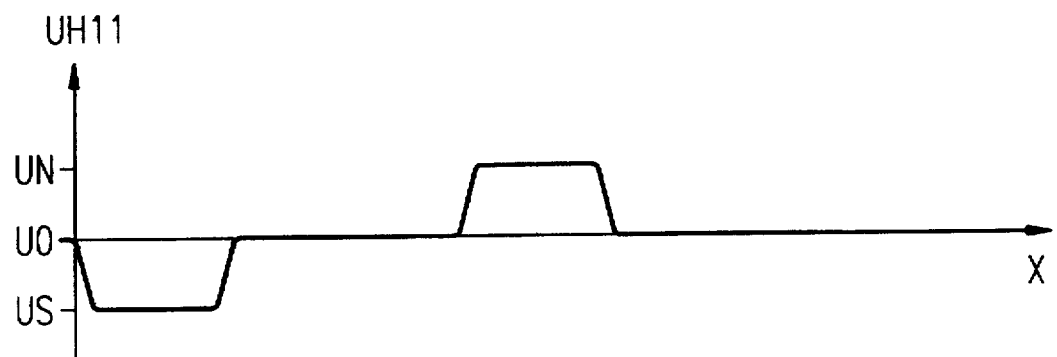

FIGS. 5a and 5b show signal diagrams of signals generated by the Hall elements 7 and 11 during scanning.

The signals are shown as a Hall voltage UH dependent on the position X. UO corresponds to a Hall voltage UH without the influence of the magnetic field. UN corresponds to Hall voltage UH when the Hall element passes a north pole, and US corresponds to Hall voltage UH when the Hall element passes the south pole.

FIG. 5a shows that the Hall voltage UH7 of the Hall element 7 at the reference mark 8.3 has a different voltage level than the Hall voltage at the end regions.

The farther Hall element 11 has, at the two opposite end regions, different voltage levels UH 11. The combination of the magnetic stripes 5.3, 5.4, 9.1, 10.1 and 10.2 provides a code for differentiating between four different regions.

The tracks 9 and 10, shown in FIG. 4, can be scanned with a single wide Hall element. This Hall element would detect, in the left end region, the resulting magnetic field of both magnetic stripes 5.3 and 10.1 at the reference mark 8.3, the resulting magnetic field of both magnetic stripes 9.1 and 10.2, and in the right end region the magnetic field of the magnetic stripe 5.4. The signal diagram of Hall voltages of this, not shown, Hall element is shown in FIG. 6.

The appropriate coding and the distinction between reference marks or right and left end positions can also be effected by using magnetic stripes having different widths and/or by using differently magnetized stripes.

To obtain a different level of stripe magnetization, the stripes can be formed as a pack with a plurality of separate stripes abutting each other, with the same sign poles facing in the same direction. The advantage of this consists in that the magnetic stripes with the same magnetizing current should be used, and can easily be arranged in a track.

Figure 6:
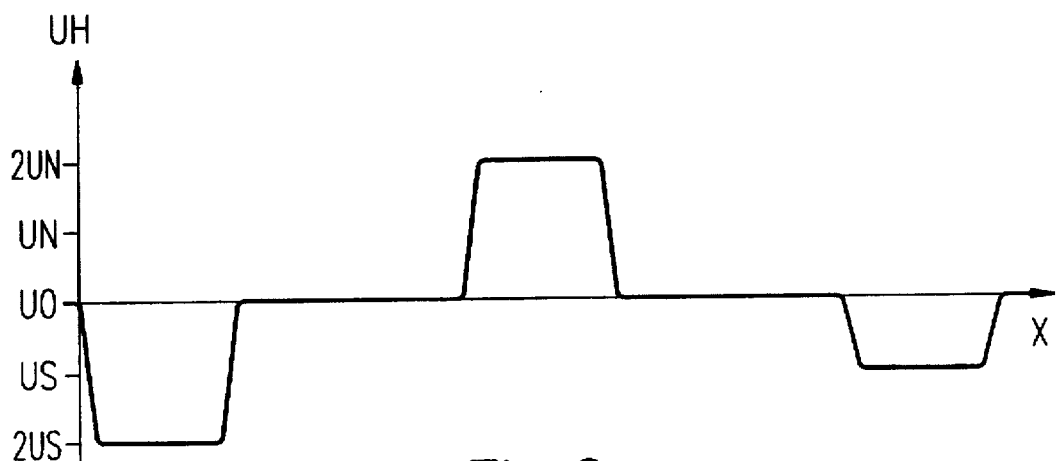
FIG. 6 shows another signal diagram of the linear encoder of FIG. 4.

The output signal diagram shown in FIG. 6 can thus be obtained when the magnetic stripe 10.1, in FIG. 4, is glued onto the magnetic stripe 5.3, and the magnetic stripe 10.2 is glued onto the magnetic stripe 9.1.

It is also possible to provide one track for the selection of a reference mark, and another track for the recognition of end regions, which would include magnetic stripes of different polarity.

For distinguishing (coding) of different positions of the end regions, as well as of different reference marks, the magnetic stripes can be arranged in more than two tracks.

When incremental encoders with reference marks are used, it is advantageous when, after the interruption of a measuring or machining process, the next reference mark is sensed in the correct direction. To this end, it is necessary to find out, with the use of an evaluation device, whether the scanner 2 is located to the left or to the right of the reference mark. Such linear encoder are per se known and are described in German Publications DE 35 26 206 A1 and DE 92 09 801 U1.

Figure 7:
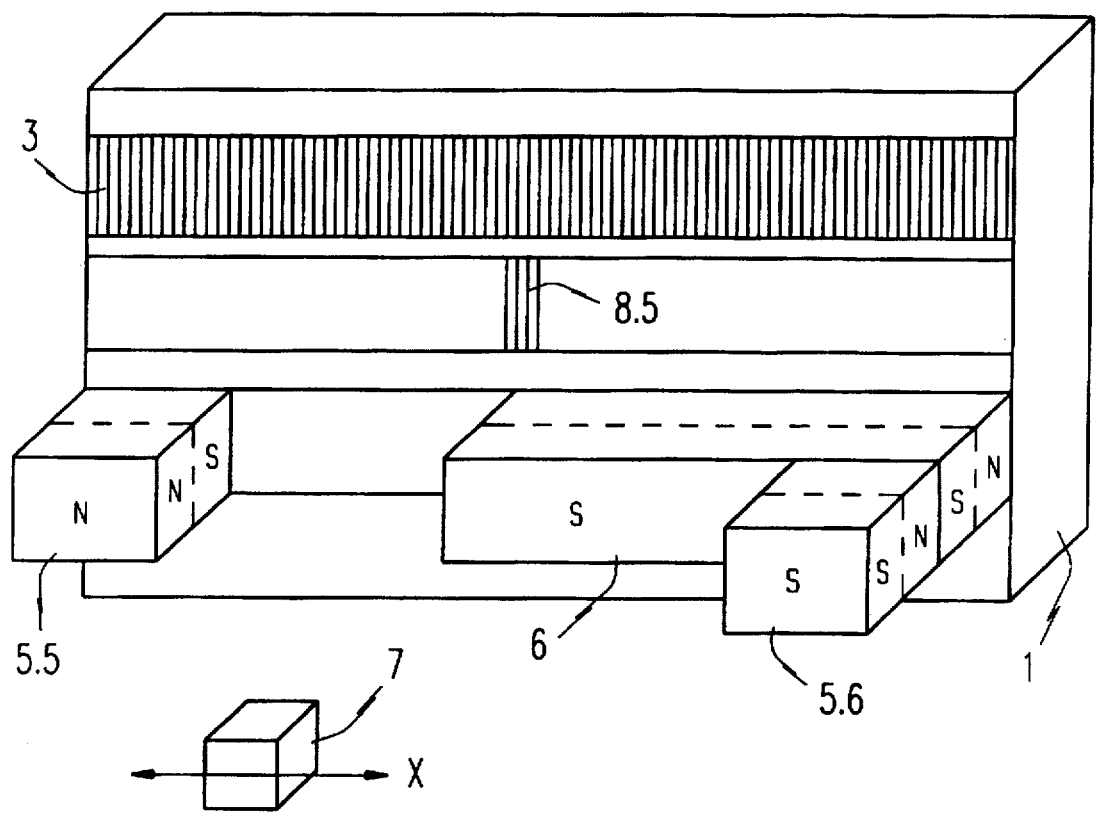
FIG. 7 shows a measuring standard with a magnetic stripe for distinguishing righthand and lefthand regions of a reference mark.
Figure 8:
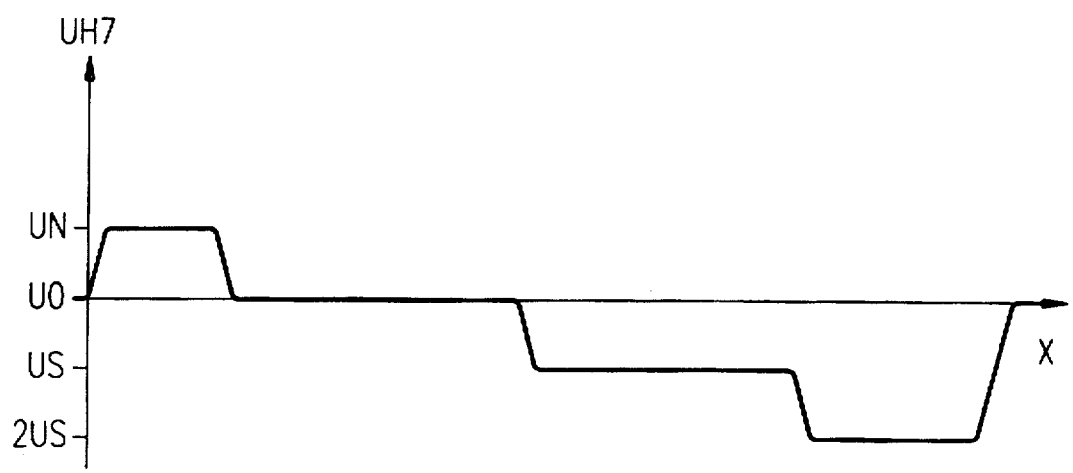
FIG. 8 shows a signal diagram resulting from scanning of the measuring standard of FIG. 7.

Such a linear encoder is shown in FIG. 7, in which in addition to magnetic stripes 5.5 and 5.6 at the end regions, a magnetic stripe 6 is provided for marking a region right of the reference mark 8.5. At the left end of the magnetic standard 1, the magnetic stripe 5.5 is glued thereto with its south pole surface, whereby during scanning with the Hall element 7, a Hall voltage UH7=UN is generated, as shown in FIG. 8.

On the right side of the reference mark 8.5, the magnetic stripe 6 is glued to the measuring standard 1 with its north pole surface, so that the south pole surface of the magnetic stripe 6 faces the Hall element 7.

At the right end of the measuring standard 1, a magnetic stripe 5.6 is glued to the magnetic stripe 6 with- its north pole surface, so that the south pole surface of the magnetic stripe 5.6 faces the Hall element 7. During the movement of the scanner Hall element 7 relative the measuring standard 1, a Hall voltage UH7, as shown in FIG. 8, is generated. FIG. 8 shows that the Hall voltage UH7, along the entire measuring length, has four different voltage levels UN, UO, US and 2US and clearly defines four different regions of the measuring standard 1.

The magnetic stripes 5.1–5.6, 9.1, 10.1, and 10.2 can also be arranged in a groove of the measuring standard 1 and be shifted there and, thus, can be adjustably secured to the measuring standard 1.

Figure 9:
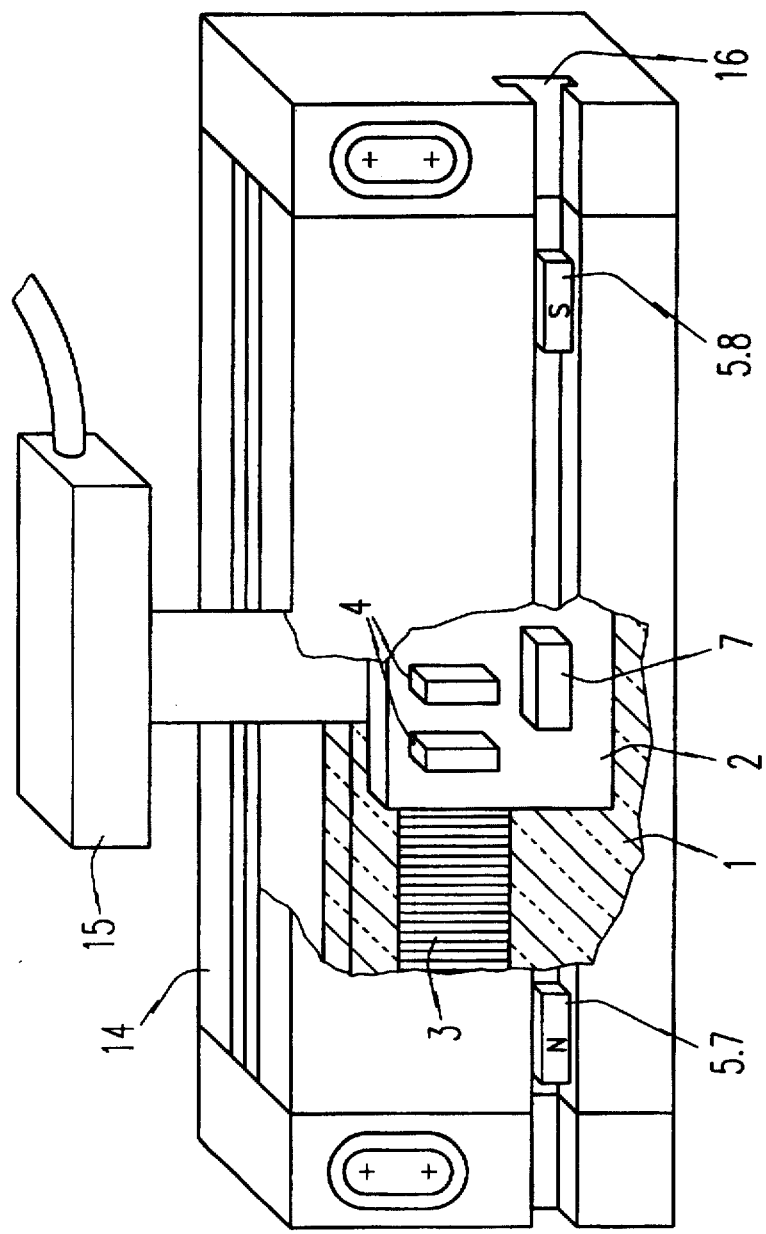
FIG. 9 shows an encapsulated linear encoder.

FIG. 9 shows the use of the present invention in an encapsulated linear encoder. As shown in FIG. 9, the measuring standard 1 with the graduation 3 is secured inside of a housing 14 and is scanned with a scanner 2 secured on a mounting block 15. The limit position switches are formed by respective magnetic stripes 5.7 and 5.8, which are scanned with the Hall element 7 of the scanner 2.

For the adjustable connection of the magnetic stripes 5.7 and 5.8, a groove 16 is provided in the outer surface of the housing 14 for receiving the stripes 5.7 and 5.8. The magnetic stripes 5.7 and 5.8 are so arranged that they have, respectively, the north pole surface facing the Hall element on the left side, and the south pole surface facing Hall element 7 on the right side.

In the housing 14, additional tracks can be provided for receiving additional magnetic stripes, as shown in FIGS. 3, 4 and 7. The magnetic stripes can also be glued to an outer or inner surface of the housing.

Instead of a housing, the measuring standard can be secured on a carrier which, in turn, can be secured to an object to be measured. In this case, the magnetic stripes can be secured to the carrier.

To prevent accumulation of metal chips around the magnetic stripes, they are preferably covered with a plastic material.

According to the invention, the magnetic stripes can be provided in the scanner, with the Hall element being provided in the end regions of the measuring standard or the standard carrier.

The present invention is used in incremental and coded linear and angular encoders where, in accordance with the need, for the limitation of the operational region, one or several magnetic stripes are provided.

The Hall element 7 and/or 11 is preferably connected to a monitoring circuit 20 for detecting a failure resulting from some internal defect of the Hall element or rupture of any of the conductors 24–27. Upon detecting the failure of a Hall element, the motor of a respective drive is immediately shut down to prevent overrunning the limit position and, thereby, a collision with any structural element of the machine.

The monitoring circuit 20 can also be used for providing an alarm signal upon failure of the Hall element and/or rupture of the conductors.

Figure 10:
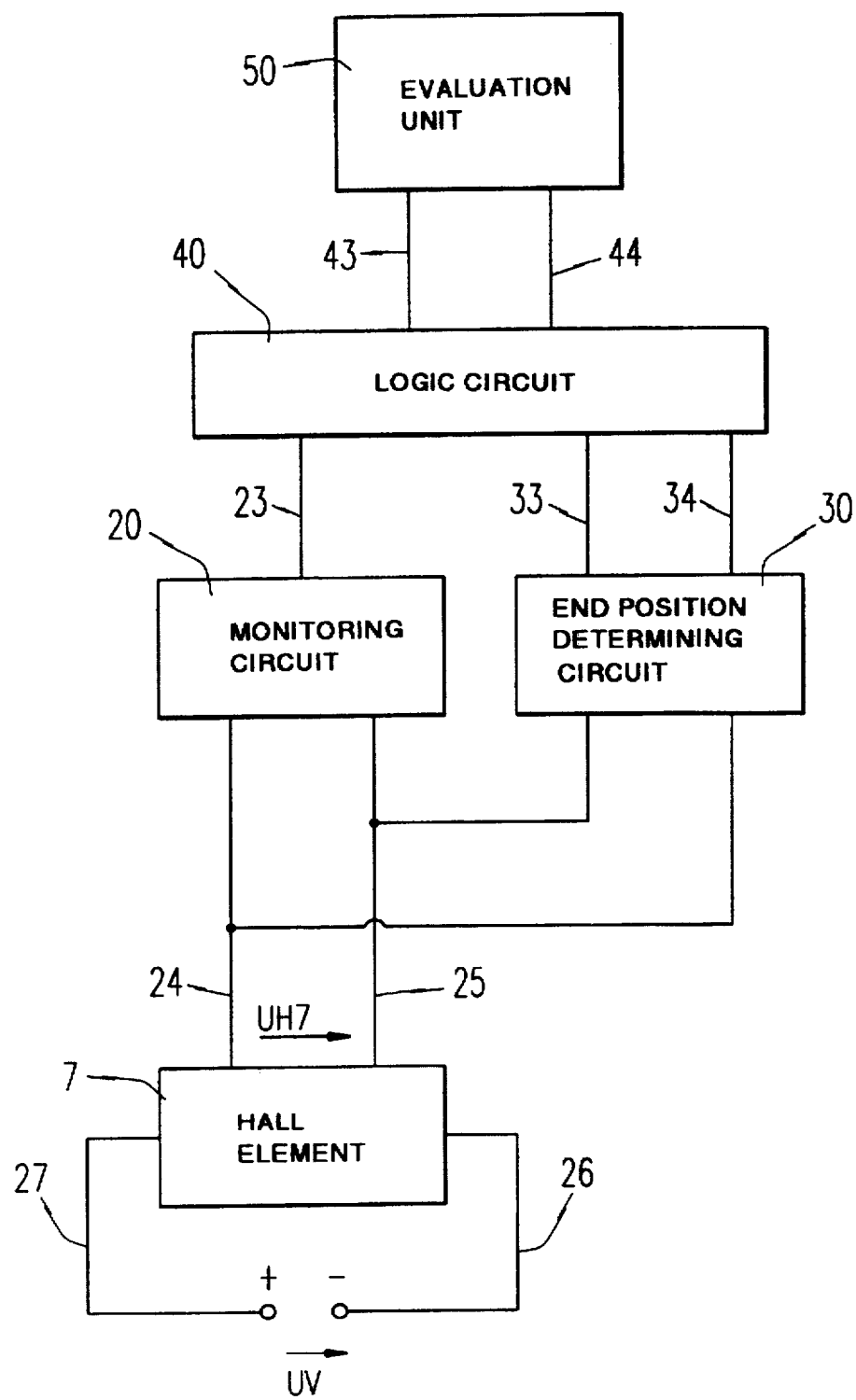
FIG. 10 shows a circuit diagram for evaluation of a Hall voltage.

FIG. 10 shows a circuit diagram to which the Hall voltage UH7 of the Hall element is fed. The circuit consists of the monitoring circuit 20, a circuit 30 for determining the end positions, a logic circuit 40, and an evaluation unit 50.

Figure 11:
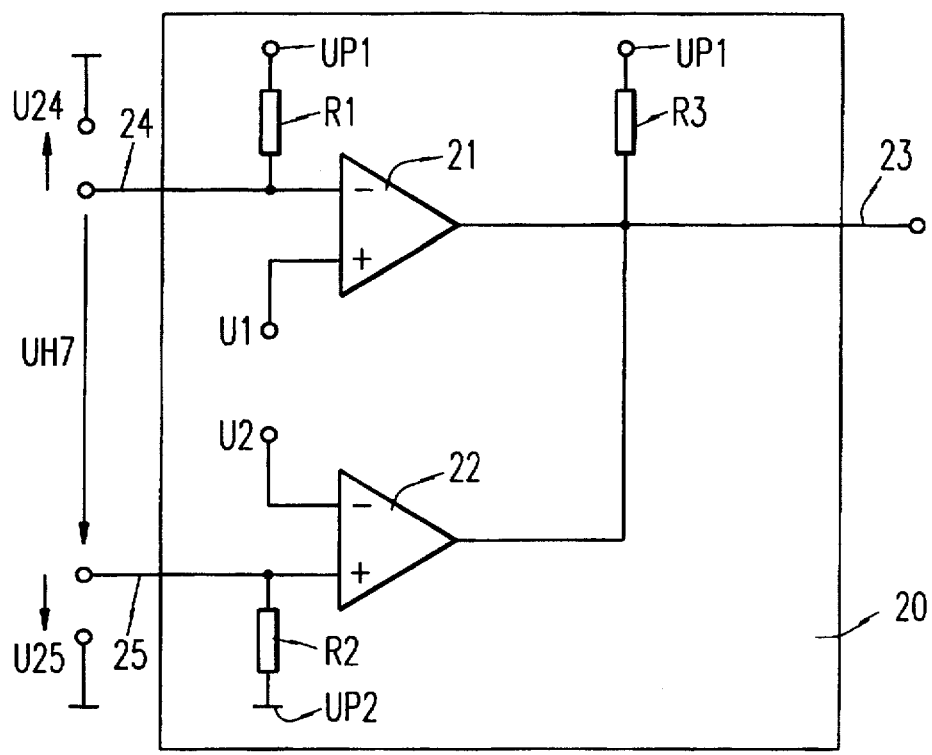
FIG. 11 shows a monitoring circuit.

The monitoring circuit 20 is shown in detail in FIG. 11. The Hall element is operable with a voltage UV=5 V from a voltage source. The voltage of the Hall element UH7 is taken as differential voltage of feed conductors 24 and 25, which connect the Hall element with the monitoring circuit 20.

The Hall voltage in the absence of magnetic field generally is 0 V. In the presence of a magnetic field, the Hall voltage UH7 increases or decreases, dependent on the direction of the magnetic flux. In conventional Hall generators in the absence of a magnetic field, the voltage at each of the feed conductors is about half of the source voltage UV. When the voltages U24 and U25 of the feed conductors 24, 25 are measured, respectively, against the 0 V potential, then at UV=5 V, U24=U25=UV/2=2.5 V.

Figure 14:
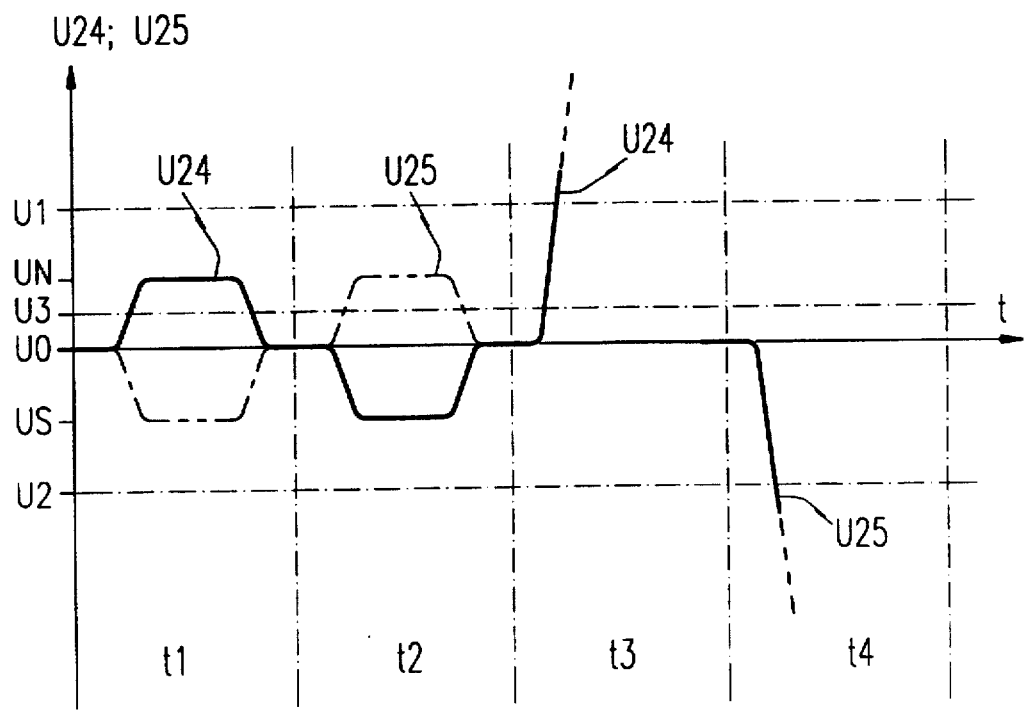
FIG. 14 shows a signal diagram of signals generated by scanning of the magnetic stripes according to FIG. 9.

The voltage is shown in FIG. 14 as UO. With the left magnetic stripe 5.7 (FIG. 9) facing the Hall element 7 with its north pole, the voltage UH7 raises by about 100 mV, with U24=2.55 V and U25=2.45 V. This condition is shown in FIG. 14 in the region t1. With the right magnetic stripe 5.8 (FIG. 9) facing the Hall element with its south pole, the voltage UH7 falls by about 100 mV, with U24=2.45 V and U25=2.55 V. This condition is shown in FIG. 14 in the region t2.

Maximum and minimum voltages at the feed conductors 24, 25 during normal operational conditions are designated with UN and US. The monitoring circuit 20 insures the detection of failure of the Hall element 7 as well as the rupture of conductors 24, 25, by insuring that the voltage U24 exceeds the magnitude UN and the voltage U25 is below the magnitude US when the failure and/or the rupture takes place. To this end, the feed conductor 24 is connected to a bias voltage UP1=5 V via a protective resistor R1, and the feed conductor 25 is connected to a reference potential UP2 via a protective resistor R2.

Each of the feed conductors 24, 25 is connected to a respective comparator 21, 22. Each of the comparators 21, 22 generates at its output a logical binary signal 0 when the voltage at the inverted (−) input is greater than the voltage at the non-inverted input (+). Correspondingly, the output signal is 1, when the voltage at the inverted input (−) is smaller than the voltage at the non-inverted input (+).

The voltage U24 of the Hall element 7 is fed to the inverted input (−) of the comparator 21, together with the bias voltage UP1. To the non-inverted (+) input of the comparator 21, a comparison voltage U1=2.7 V is fed.

The Hall element voltage U25 is fed to the non-inverted input (+) of the second comparator 22, with a comparison voltage U2=2.3 V being feed to the inverted input (−) of the comparator 22.

The outputs of the two comparators 21 and 22 are connected with each other, forming a common output of the monitoring circuit 20 which is connected to the bias voltage UP1 via a resistor R3. An output conductor 23 connects the monitoring circuit 20 to an appropriate drive.

If a rupture occurs in the conductor 24, the voltage U24, detected by the monitoring circuit, increases to about that of the bias voltage UP1=5 V. This condition is shown in FIG. 14 in the region t3. The increase results from the defined bias voltage UP1 at the protective resistor R1, which is also called "pull-up resistor". The voltage U24 likewise increases to about 5 V, when the conduit 26 leading to the Hall element 7 is damaged. The Hall element voltage U25 falls to UP=0 V when one of the conductors 25 or 27 is damaged. This condition is shown in FIG. 14 in the region t4. Likewise, when the Hall element 7 itself fails, the voltage, U24 or U25 raises or falls, respectively, to 5 V or 0 V.

For the generation of an output signal, the voltages U24 and U25 are compared with the comparison voltages U1 and U2. An error signal (binary signal O1) is generated when the voltage U24 exceeds the comparison voltage U1 or when the voltage U25 is below the comparison voltage U2. When the voltages U24 and U25 are within the range defined by the comparison voltages U1 and U2, the binary signal 1 is generated indicating a normal operation.

Figure 12:
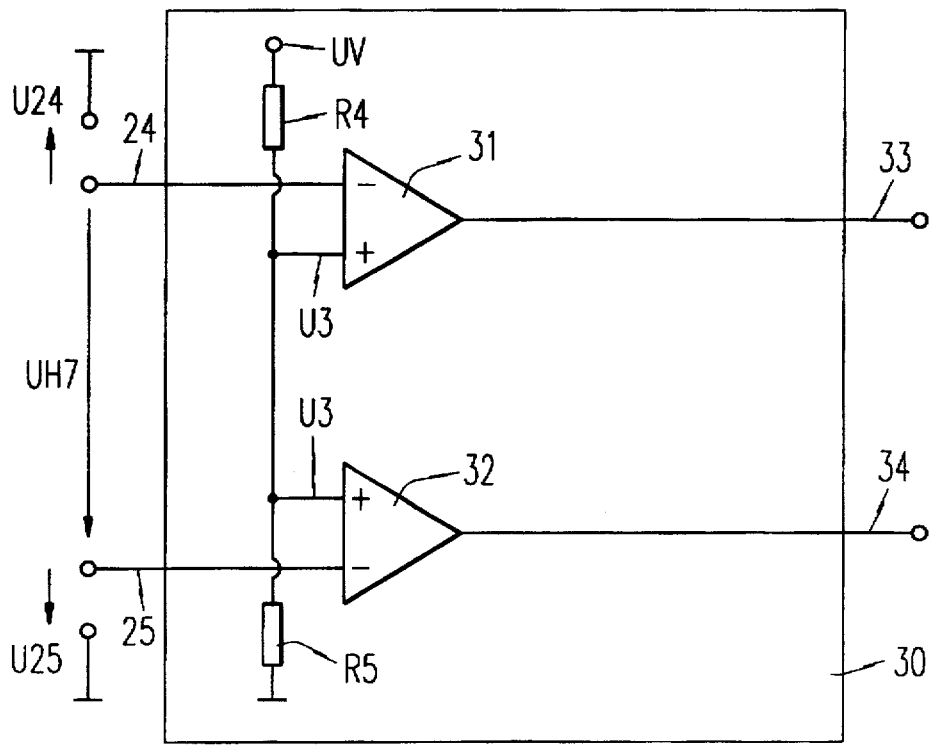
FIG. 12 shows a circuit diagram for distinguishing the end regions.

The circuit 30 for the detecting of the end regions, right or left, is shown in FIG. 12. The voltages U24 and U25 of the Hall element 7 are, in this case, compared by two other comparators 31 and 32 with a further comparison voltage U3. The comparison voltage U3 is derived from the source voltage UV with the help of a voltage divider formed of two resistors R4 and R5. The comparison voltage U3=2.525 V.

As shown in FIG. 9, the magnetic stripe 5.7 at the left end region has its north pole surface facing the Hall element 7. In this region, the output Hall element voltage UH7=100 mV, with U24=2.55 V and U25=2.45 V, as shown in the region t1 of FIG. 14.

The voltage V24 is compared by the comparator 31 with the comparison voltage U3=2.525 V, whereby on the output 33 of the circuit 30, a binary signal 0 is generated when U24>U3, and a binary signal 1 is generated when U24<U23.

When the scanner 2 reaches the right end region, the output voltage of the Hall element UH7=100 mV, because in this region, the magnetic stripe 5.8 faces the Hall element 7 with its South pole surface, so that the direction of the magnetomotive force of the magnetic field is from the Hall element 7 toward the magnetic stripes 8.

The voltage U25, which is shown in FIG. 14 in the region t2, is compared by the comparator 32 with the comparison voltage U3. At U25>U3, a binary signal 0 is generated at the output 34, and a binary signal 1 is generated at U25<U3. Thus, the outputs of the circuit 30 provide a clear indication of whether the scanner 2 is at the left or right end of the measuring standard 1. When the scanner 2 reaches the left end of the measuring standard 1, at the output 33 a binary signal 0 or 1 appears. When the scanner 2 reaches the right end of the measuring standard 1, a binary signal 0 or 1 appears at the second output 34.

Figure 13:
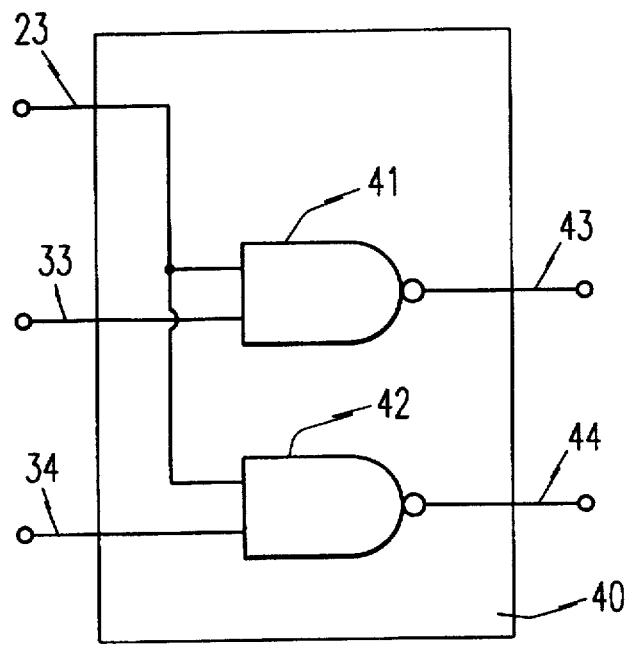
FIG. 13 shows a logic circuit.

The monitoring circuit 20 and the end region detecting circuit 30 are preferably mounted in the scanner 2. In addition, the linear encoder in accordance with the present invention, comprises a logic circuit 40 shown in FIG. 13. The output conductor 23 of the monitoring circuit 20 and the output conductors 33 and 34 of the circuit 30 are connected to the logic circuit 40. The logic circuit 40 is formed of two NAND-gates 41 and 42.

The monitoring signal and the end position signal of the left end region are fed to the NAND-gate 41 via the conductors 23 and 33, so that, dependent on the signals communicated via the conducts 23 and 33, the following output signals will be generated at the output conduit 43 of the logic circuit 40:

```
23 | 0101
   |
33 | 0011
43 | 1110
```

Likewise, the monitoring signal and the end position signal of the right end region are fed to the NAND-gate 42 via conductors 23 and 34 so that, dependent on signals communicated via the conductors 23 and 34, the following output signals will be generated at the output conduit 44 of the logic circuit 40:

```
23 | 0101
   |
34 | 0011
44 | 1110
```

The logic circuit transfers the information communicated via three conductors 23, 33 and 34 with two conductors 43 and 44 to an evaluation unit 50 which, as a rule, is located further away from the measuring location. The binary signals of the conductors 43 and 44 define the position and the condition of the Hall element 7. The following determination can be obtained:

| | Possible binary signal combinations: | |
|---|---|---|
| Conduit 43 | 1 | 1 |
| Conduit 44 | 1 | 0 |
| Position/Condition | Conduit/Rupture Defect of the Hall Element 7 | Left End region with N-pole |
| Conduit 43 | 0 | 0 |
| Conduit 44 | 1 | 0 |
| Position/Condition | right end region with S-pole | Operational |

Figure 15:
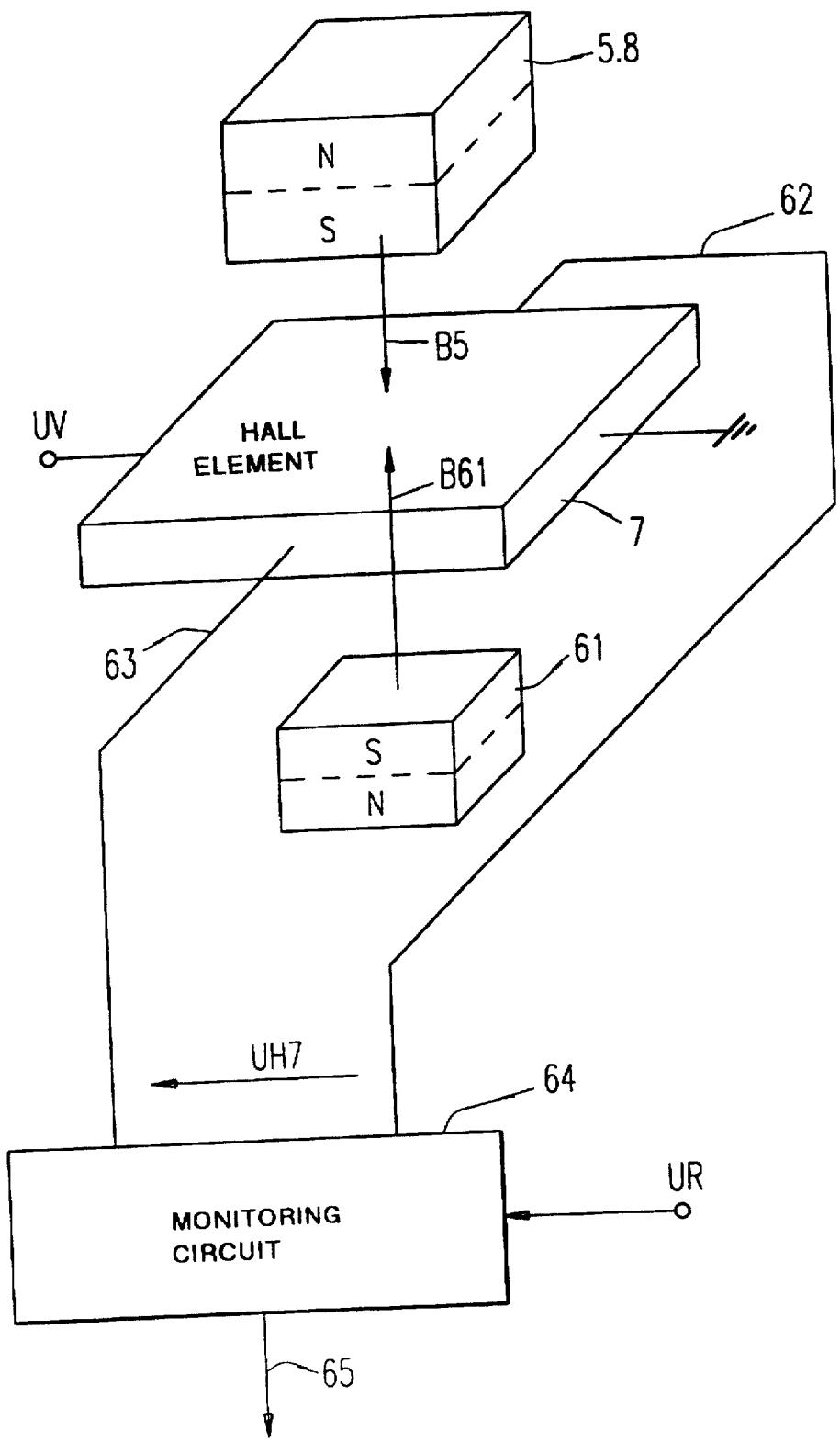
FIG. 15 shows another monitoring circuit.
Figure 16:
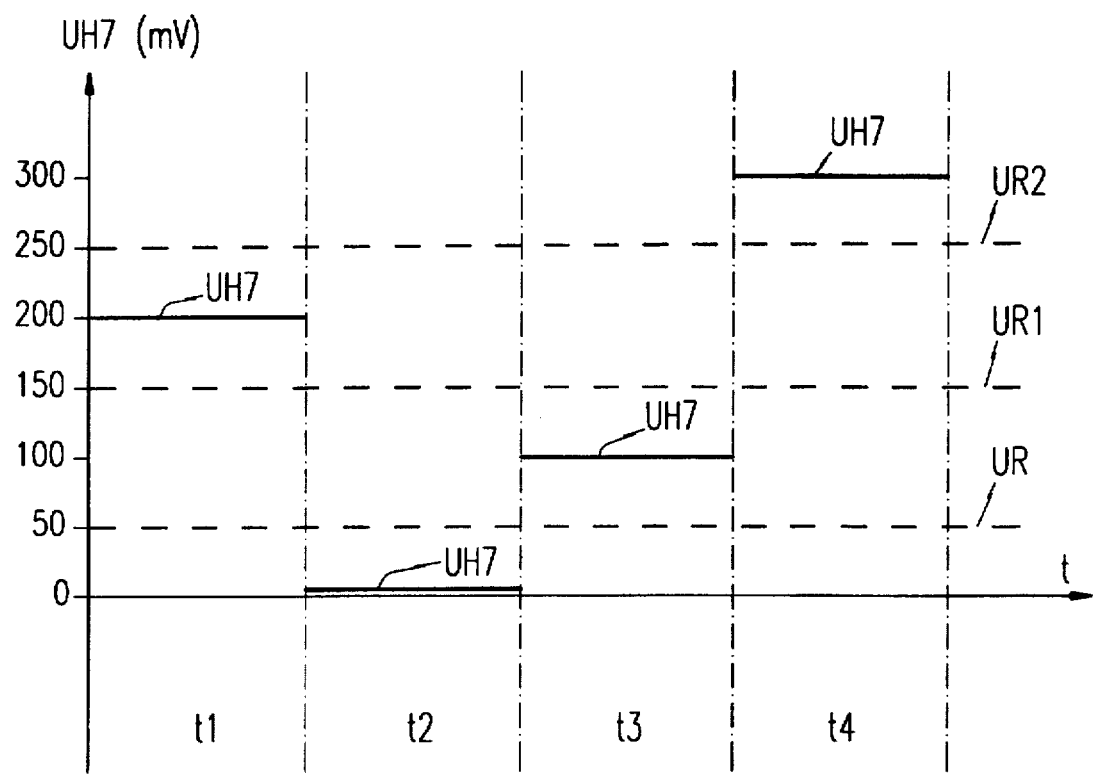
FIG. 16 shows yet another signal diagram.

A further explanation of additional possibilities of monitoring the Hall element 7 will now be made with reference to FIGS. 15 and 16.

The evaluation unit comprises an electromagnet 61, which is fixed with respect to the Hall element 7, e.g., is glued thereto. The magnet 61 generates a magnetic field 61 which induces an increase of the Hall voltage UH7, which in the absence of the magnetic field, is closed to 0 V, to about 200 mV. This condition is shown in FIG. 16 in the region t1. For a better representation of the Hall voltage UH7, in this example a higher Hall voltage is selected than in the example discussed above.

If the voltage source fails, any of the conductors 62, 63 fails and/or the Hall element 7 fails, the Hall voltage UH7 falls to 0 V. This condition is shown in FIG. 16 in the region t2. The voltage fall can be detected with a known trigger switch located in the monitoring circuit 64. In the monitoring circuit 64, the Hall voltage UH7 of the conductors 62, 63 is compared with a predetermined comparison voltage UR. If the Hall voltage UH7 is below the comparison voltage UR, an error signal will appear in the output conductor 65 of the monitoring circuit 64.

When the Hall element 7 reaches the region of influence of the magnetic field of one of the magnetic stripes 5.7 and 5.8 (see FIG. 9), the Hall voltage UH7 raises or falls. FIG. 15 shows a condition in which the Hall element 7 of the scanner 2 is in the region of the right limit position of the linear encoder. The magnetic stripes 5.8 generates a magnetic field B5, the direction of which is opposite to that of the magnetic field B61. Under these conditions, the Hall voltage UH7 falls by about 100 mV to 100 mV. This condition is shown in FIG. 16 in the region t3.

When the Hall element 7 reaches the region of influence of the magnetic field B5 of the magnetic stripes 5.7, the direction of which coincides with that of the magnetic field B61 of the stationary magnet 61, the Hall voltage UH7 increases by 100 mV to 300 mV. This condition is shown in FIG. 16 in the region t4. In order to detect a failure of the Hall element 7 under these conditions, the comparison voltage UR is set to be 50 mV. If the Hall voltage UH7 falls below 50 mV, an error signal is generated.

To prevent a collision during the failure of the Hall element 7, the error signal is used to shut off the machine drive. Thus, upon the failure of the Hall element or upon the rupture of conductors 62, 63, prevent overrunning of a limit position, the shut-off signal is communicated to the machine control, e.g., numerical control or directly to the shut-off relay of the machine drive. For generating a shut-off signal in the monitoring circuit 64, the Hall voltage UH7 is compared with two comparison voltages UR1=150 mV and UR2=250 mV. The normal operation thus lies between 150 and 250 mV. The shut-ff signal appears in the conductor 65 when the Hall voltage UH7 either falls below 150 mV or rises above 250 mV.

When in the limit positions and the direction of the magnetic field of both magnetic stripes is the same, as shown in FIG. 3 for stripes 5.3, 5.4, the Hall voltage UH7 is compared only with a single comparison voltage UR1 to provide an error signal. To this end, the comparison voltage is so selected that the Hall voltage UH7 falls below it when the limit position is reached or the Hall element 7 fails.

It is advantageous to provide one Hall element for scanning of the magnetic stripes 5.2, 5.5 and 5.7 having one common direction of their magnetic field, and another Hall element for scanning of the magnetic stripes 5.1, 5.3, 5.4, 5.6, and 5.8 having another common direction of their magnetic fields opposite to the one direction. A stationary magnet is associated with each Hall element, with the direction of the magnetic field of the magnets being opposite to those of the magnetic stripes 5.1–5.8. The advantage of it consists in that a larger operational range for the Hall voltage UH7 is guaranteed, without oversaturating the Hall element.

Because the Hall voltage either increases above or falls below 0 V, the Hall element voltage need be compared only with one comparison voltage for detecting a limit position and/or failure of the Hall element.

To insure the communication of the shut-off signal to the NC-control or the shut-off relay, a two-channel signal path from the measuring standard to the NC-control or the shut-off relay is provided, with the signal being communicating with a push-pull action.

To this end, via one conductor a shut-off signal and via the other conductor an inverse signal, are communicated. The appearance of identical signals at the input of the receiver (NC-control, shut-off relay) indicates an error in the signal transmission. Even in this case, it makes sense to stop the machine drive.

Though the present invention was shown and described with reference to the preferred embodiments, various modification thereof will be apparent to those skilled in the art and, therefore, it is not intended that the invention be limited to the disclosed embodiments or details thereof, and departure can be made therefrom within the spirit and scope of the appended claims.

What is claimed is:

1. An encoder for determining a position of an object, comprising:

a measuring standard with a graduation having, with respect to a measuring direction, righthand and lefthand regions each having a limit position region defining a limit position of the object;

first magnetic means located at the righthand region and defining the limit position region of the righthand region;

second magnetic means located at the lefthand region and defining the limit position region of the lefthand region;

a scanner displaceable relative to the measuring standard and including means for scanning same for determining the position of the object relative to the measuring standard and a Hall element for scanning the first and second magnetic means for generating a first Hall element voltage at the first magnetic means and a second Hall element voltage at the second magnetic means; and a circuit for distinguishing the limit position regions of the righthand and lefthand regions by comparing the first and second Hall element voltages with at least one comparison voltage.

2. A encoder as set forth in claim 1, further comprising control means for controlling displacement of the scanner relative to the measuring standard, and wherein upon the Hall element reaching the limit position of one of the righthand and lefthand region, a turnoff signal is communicated to the control means for stopping displacement of the object.

3. An encoder as set forth in claim 1, wherein the first and second magnetic means are magnetic stripes having opposite sides defining north- and south-poles, the north-pole of the first magnetic stripe and the south-pole of the second magnetic stripe facing the scanner, and wherein the north- and south-poles define magnetic fields extending transverse to the measuring direction.

4. An encoder for determining a position of an object, comprising:

a measuring standard including a reference mark having, with respect to a measuring direction, righthand and lefthand regions;

a measuring standard carrier;

magnetic means provided on at least one of the measuring standard and the standard carrier for determining the righthand and lefthand regions and comprising a magnetic strip located at one of the righthand and lefthand regions of the reference mark; and a scanner displaceable relative to the measuring standard in the measuring direction for scanning the measuring standard and including a Hall element for scanning the magnetic stripe and for generating a signal indicative of the righthand and lefthand regions of the reference mark upon scanning of the magnetic stripe.

5. An encoder as set forth in claim 4, wherein the magnetic stripe extends along an entire measuring length of the one of the righthand and lefthand regions, and wherein the magnetic means includes further magnetic stripes provided in the end regions of the measuring standard.

6. An encoder as set forth in claim 4, further comprising control means for controlling displacement of one of the measuring standard and the scanner, and wherein, upon occurrence of one of the monitoring circuit generating the error signal and the Hall element reaching a limit position, a turn-off signal is communicated the control means.

7. An encoder as set forth in claim 6, wherein the turn-off signal is communicated to two conductors in accordance with push-pull action.

8. An encoder as set forth in claim 4, wherein the Hall element has a plurality of outputs, wherein the encoder includes a plurality of conductors connecting the plurality of Hall element outputs with the monitoring circuit, wherein the generating means includes comparison means having a plurality of comparison voltages defining an error-free operational region of the Hall element, and wherein the error signal is generated when voltages of the plurality of conductors deviates from the comparison voltages.

9. An encoder as set forth in claim 8, wherein the monitorning circuit has bias voltage terminal means and reference potential terminal means, and wherein the plurality of conductors connecting the Hall element outputs to the monitoring circuit includes two conductors connected to the bias voltage terminal means and the reference potential terminal means, respectively, at which the error signal is generated.

10. An encoder as set forth in claim 8, wherein the comparison means includes two comparators each having two inputs, wherein the voltage of the conductor connected to the bias voltage terminal means, together with the bias voltage, are fed to one of the inputs of one of the comparators, and one of the comparison voltages is fed to another of the inputs of the one of the comparators, and wherein the voltage of the conductor connected to the reference potential terminal means, together with the reference potential, are fed to one of the inputs of another of the comparators, and another of the comparison voltages is fed to another of the outputs of another of the comparators.

11. An encoder as set forth in claim 4, further comprising a circuit for distinguishing two opposite end positions, wherein the Hall element is connected to the distinguishing circuit in which a Hall element voltage is compared with at least one comparison voltage and which generates two end position-defining signals in response to the comparison, wherein two outputs of the distinguishing circuit and the output of the evaluation circuit are connected to a logic circuit, with the two end position-defining signals being generated at the two outputs of the distinguishing circuit, respectively, and wherein the logic circuit has two outputs, a combination of signals generated at the two outputs of the logic circuit defining the end positions and a condition of the Hall element.

12. An encoder as set forth in claim 4, wherein the Hall element is associated with a stationary magnet that sets a predetermined magnitude of a Hall voltage of the Hall element different from 0 voltage.

13. An encoder as set forth in claim 12, wherein a magnetic field of the stationary magnetic is opposite to an external magnetic field to be crossed by the Hall element.

14. An encoder as set forth in claim 4, further comprising a circuit for monitoring a predetermined operation of the Hall element which is connected to the monitoring circuit, the monitoring circuit including an output and means for generating an error signal at the output upon deviation of an operational voltage of the Hall element from a predetermined operational voltage thereof.

15. An encoder for determining a position of an object, comprising
- a measuring standard having, with respect to a measuring direction, righthand and lefthand regions each having a limit position region defining a limit position of the object;
- a measuring standard carrier;
- a magnetic means provided on at least one of the measuring standard carrier and the measuring standard and including magnetic strip means located at one of the righthand and lefthand regions of the measuring standard and defining the limit position region of the one of the righthand and lefthand regions; and
- a scanner displaceable relative to the measuring standard and including means for scanning same for determining the position of the object relative to the measuring standard, and a Hall element for scanning the magnetic stripe means for determining both the righthand and lefthand regions and the limit position region to define the limit position of the object, the Hall element generating a signal for stopping an object displacement upon scanning the limit position region.

16. An encoder for determining a position of an object, comprising:
- a measuring standard;
- a measuring standard carrier;
- magnetic means provided on one of the measuring standard and the standard carrier and including a magnetic stripe at least in one of limit position regions for defining a limit position of the object; and
- a scanner displaceable relative to the measuring standard and including means for scanning same for determining the position of the object relative to the measuring standard, and a Hall element for scanning the magnetic stripe for determining a moment the object reaches the limit position region and for generating a signal for deactuating an object drive for stopping displacement of the object.

17. An encoder as set forth in claim 16, further comprising a circuit for controlling a predetermined operation of the Hall element.

18. An encoder as set forth in claim 17, wherein the measuring standard includes a graduation and a track with a plurality of reference marks associated with the graduation, and wherein the magnetic means comprises another magnetic stripe associated with one of the plurality of reference marks for selecting the one of the plurality of reference marks.

19. An encoder as set forth in claim 18, wherein the another magnetic stripe has opposite flat sides defining flat N- and S-poles, the another magnetic stripe being secured on at least one of the measuring standard and standard carrier, with one of the flat sides abutting a surface of the at least one of the measuring standard and standard carrier and another of the flat-sides, defining one of N- and S-poles, facing the scanner, and wherein the magnetic stripe and the another magnetic stripe associated with the one reference mark are so secured on the at least one of the measuring standard and the standard carrier that the magnetic stripe has the S-pole thereof facing the scanner and the another magnetic stripe has the N-pole thereof facing the scanner.

20. An encoder as set forth in claim 17, wherein the magnetic stripe having opposite flat sides defining flat N- and S-poles, the one magnetic stripe being secured on the at least one of the measuring standard and standard carrier, with one of the flat sides abutting a surface of the at least one of the measuring standard and standard carrier and another of the flat-sides, defining one of N- and S-poles, facing the scanner, and wherein the N- and S-pole define together a magnetic field extending transverse to the measuring direction.

21. An encoder as set forth in claim 20, wherein the magnetic means comprises a further magnetic stripe provided in another limit position region for defining another limit position of the object, wherein the further magnetic stripe has opposite flat sides defining flat N- and S-poles, with one of the flat sides abutting the surface of the at least one of the measuring standard and standard carrier and another of the flat sides defining one of the N- and S-poles facing the scanner, and wherein the magnetic stripe and the further magnetic stripe are so secured on the at least one of the measuring standard and the standard carrier that one of the magnetic stripe and the further magnetic stripe has the N-pole thereof facing the scanner and another of the magnetic stripe and the further magnetic stripe has the S-pole thereof facing the scanner to thereby provide for distinguishing the one and another limit positions of the object.

22. An encoder as set forth in claim 21, further comprising a circuit for distinguishing two opposite end positions, and wherein the Hall element is connected to the distinguishing circuit, in which a Hall element voltage is compared with at least one comparison voltage and which generate two end-position-defining output signals in response to the comparison.

23. An encoder as set fort in claim 21, further comprising a circuit for distinguishing two opposite end positions, wherein the Hall element is connected to the distinguishing circuit in which a Hall element voltage is compared with at least one comparison voltage and which generates two end position-defining signals in response to the comparison, wherein two outputs of the distinguishing circuit and the output of the evaluation circuit are connected to a logic circuit, with the two end position-defining signals being generated at the two outputs of the distinguishing circuit, respectively, and wherein the logic circuit has two outputs, a combination of signals generated at the two outputs of the logic circuit defining the end positions and a condition of the Hall element.

24. An encoder as set forth in claim 20, wherein the standard carrier is formed as a housing, and wherein the magnetic stripe is supported on the housing.

25. An encoder as set forth in claim 20, wherein the at least one of the measuring standard and the standard carrier has a groove for receiving the magnetic stripe.

26. An encoder as set forth in claim 25, wherein the standard carrier is formed as a housing, and the receiving groove is provided in the housing.

27. An encoder as set forth in claim 17, wherein the monitoring circuit includes an output and means for generating an error signal at the output upon deviation of an operational voltage of the Hall element from a predetermined operational voltage thereof.

28. An encoder as set forth in claim 27, further comprising control means for controlling displacement of one of the measuring standard and the scanner, and wherein, upon occurrence of one of the monitoring circuit generating the error signal and the Hall element reaching a limit position, a turnoff signal is communicated the control means.

29. An encoder as set forth in claim 27, wherein the Hall element has a plurality of outputs, wherein the encoder includes a plurality of conductors connecting the plurality of Hall element outputs with the monitoring circuit, wherein the monitoring circuit includes comparison means having a plurality of comparison voltages defining an error-free operational region of the Hall element, and wherein the error signal is generated when voltages of the plurality of conductors deviates from the comparison voltages.

30. An encoder as set forth in claim 29, wherein the monitoring circuit has bias voltage terminal means and reference potential terminal means, and wherein the plurality of conductors connecting the Hall element outputs to the monitoring circuit includes two conductors connected to the bias voltage terminal means and the reference potential terminal means, respectively, at which the error signal is generated.

31. An encoder as set forth in claim 29, wherein the comparison means includes two comparators each having two inputs, wherein the voltage of the conductor connected to the bias voltage terminal means, together with the bias voltage, are fed to one of the inputs of one of the comparators, and one of the comparison voltages is fed to another of the inputs of the one of the comparators, and wherein the voltage of the conductor connected to the reference potential terminal means, together with the reference potential, are fed to one of the inputs of another of the comparators, and another of the comparison voltages is fed to another of the outputs of another of the comparators.

32. An encoder as set forth in claim 27, wherein the Hall element is associated with a stationary magnet that sets a predetermined magnitude of a Hall voltage of the Hall element different from 0 voltage.

33. An encoder as set forth in claim 32, wherein a magnetic field of the stationary magnetic is opposite to an external magnetic field to be crossed by the Hall element.

34. An encoder as set forth in claim 17, wherein measuring standard defines a plurality of limit positions and includes a plurality of reference marks, and the magnetic means comprises a first plurality of magnetic stripes associated with the limit positions and a second plurality of magnetic stripes associated with the plurality of reference marks, the Hall element scanning both the first and second magnetic stripes.

35. An encoder as set forth in claim 17, wherein the magnetic stripe is glued to the at least one of the measuring standard and the standard carrier.

* * * * *